(12) United States Patent
Tomita

(10) Patent No.: US 6,207,303 B1
(45) Date of Patent: Mar. 27, 2001

(54) MULTILAYERED MAGNETIC FILM HAVING BUFFER LAYER INSERTED BETWEEN RESIN LAYER AND LAMINATED MAGNETIC FILM LAYER AND THIN FILM INDUCTOR USING THE SAME

(75) Inventor: Hiroshi Tomita, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/108,968

(22) Filed: Jul. 2, 1998

(30) Foreign Application Priority Data

Jul. 3, 1997 (JP) .................................... 9-178171

(51) Int. Cl.$^7$ .............................. B32B 15/04; H01F 1/12
(52) U.S. Cl. ......................... 428/692; 428/693; 428/900
(58) Field of Search ..................... 428/692, 693, 428/457, 900; 360/113, 126; 365.158

(56) References Cited

U.S. PATENT DOCUMENTS

| | | | |
|---|---|---|---|
| 4,658,388 | * | 4/1987 | Ishiwatari et al. . |
| 5,084,355 | * | 1/1992 | Takahashi et al. . |
| 5,133,814 | * | 7/1992 | Matsuyama et al. . |
| 5,522,946 | | 6/1996 | Tomita et al. . |
| 5,700,567 | * | 12/1997 | Utsunomiya et al. . |
| 5,949,622 | * | 9/1999 | Kamiguchi et al. . |

FOREIGN PATENT DOCUMENTS

| | | |
|---|---|---|
| 63-113836 | 5/1988 | (JP) . |
| 2-56754 | 2/1990 | (JP) . |
| 4-134469 | 5/1992 | (JP) . |
| 63-211138 | 9/1998 | (JP) . |

OTHER PUBLICATIONS

Tomita et al., "Fabrication and Magnetic Properties of Fe—Co—Based Hetero–Amorphous Magnetic Films on a Resin Layer," Toshiba Corp., vol. 22, No. 4–2 (1998) No Month.

* cited by examiner

Primary Examiner—Deborah Jones
Assistant Examiner—Jennifer McNeil
(74) Attorney, Agent, or Firm—Finnegan, Henderson, Farabow, Garrett & Dunner, L.L.P.

(57) ABSTRACT

A multilayered magnetic film comprises a resin layer and multilayered magnetic film layer including one or more than one magnetic layers and one or more than one insulation layers and separated from the resin layer by a predetermined distance. A buffer layer is inserted into at least part of the interface between the resin layer and the multilayered magnetic film layer. The magnetic layer or layers of the multilayered magnetic film layer contain at least Fe and Co or at least Fe, Co, B and C.

6 Claims, 7 Drawing Sheets

MULTILAYERED MAGNETIC FILM HAVING BUFFER LAYER INSERTED BETWEEN RESIN LAYER AND LAMINATED MAGNETIC FILM LAYER AND THIN FILM INDUCTOR USING THE SAME

BACKGROUND OF THE INVENTION

This invention relates to a multilayered magnetic film to be used for planar type magnetic elements such as planar inductors and planar transformers and also to a thin film magnetic element comprising such a multilayered magnetic film.

In recent years, the down-sizing trend of equipment has been ever more remarkable. However, to date, the power source contained in such equipment have failed to be down-sized proportionally so that consequently the relative space occupied by the power source in the equipment has been on the rise. The down-sizing of electronic equipment owes greatly to the use of LSIs for electric circuits. On the other hand, miniaturization and circuit integration of inductors, transformers and other indispensable magnetic components of the power source have not been successful as that of the components of the electronic equipment itself. This is a principal cause of the fact that the relative volume of the power source in electronic equipment has been raised.

To solve this problem, the use of planar type soft magnetic elements that combine planar coils and magnetic members has been proposed. Studies are under way to improve the performance of planar magnetic elements. Unlike conventional magnetic elements, a planar type magnetic element is characterized in that the magnetic core is not limited to an inner core and may comprise a magnetic thin film or a magnetic foil.

Generally, the magnetic permeability in the high frequency zone is produced by way of a process of rotational magnetization. Therefore, magnetic excitation along the magnetization hard axis is indispensable under the condition of uniform in-plane uniaxial anisotropy to realize an ideal process of rotational magnetization. Then, physical properties including magnetic permeability and coercive force along the magnetization hard axis are important. The high frequency complex magnetic permeability of a specimen represents a value that is related to various physical properties of the specimen in a complicated way, although the dispersion of internal stress and magnetic anisotropy has to be sufficiently low to realize an ideal and planar real part and a sufficiently small imaginary part for the frequency characteristics of the specimen.

Thin film magnetic elements such as thin film inductors can provide a large electric power and a large saturation current when the magnetic film shows an enhanced level of saturation magnetization. Therefore, a high level of saturation magnetization is advantageous for the magnetic film of such an element. It is believed that a soft magnetic film having a high saturation magnetization and an in-plane uniaxial magnetic anisotropy and showing a low loss for high frequency magnetic excitation above 1 MHz can suitably be used for a planar type thin film magnetic element.

While the physical properties of the magnetic film are important for the planar thin film magnetic element, the multilayered structure including the magnetic film and the other layers such as a coil layer, an insulation layer and other layers and the interfaces of the layers of the laminate are also important from the viewpoint of the characteristics of the thin film magnetic element.

The interface of the resin layer and the multilayered magnetic film layer is indispensable for a known thin film magnetic element because the resin layer is particularly effective for filling the space of a coil layer for insulating the upper surface of the coil and for producing a plane surface. Particularly, the coiled section is required to have a significant height in a planar type magnetic element that has to deal with a large electric power and a large electric current at a low loss. For example, a resin material which is preferably polyimide can advantageously be used for filling the space of the coil layer having a height greater than 10 $\mu$m.

Various techniques have been proposed for preparing a multilayered magnetic film.

For example, Japanese Patent Application Laid-Open No. 2-56754 discloses a technique for preparing a photomagnetic disc comprising steps of forming a buffer layer and a base protection layer by sputtering and subsequently forming a magnetic film thereon. Japanese Patent Application Laid-Open No. 4-134469 discloses a multi layered magnetic film obtained by laying a third magnetic film layer having an easily magnetizable direction on first and second magnetic film layers having a vertical magnetic anisotropy. Japanese Patent Application Laid-Open No. 63-113836 discloses a photomagnetic recording medium obtained by forming a layer of silicon nitride and aluminum nitride on a transparent substrate, the surface of which layer is then subjected to high frequency etching and sputtering, and subsequently forming thereon a magnetic film. Japanese Patent Application Laid-Open No. 63-211138 discloses a multilayered magnetic film obtained by sequentially laying an adhesive dielectric layer of a material such as silicon nitride on a plastic substrate and a non-crystalline magnetic layer thereon to produce an improved power of adhering to the substrate.

FIG. 13 schematically illustrates the structure of a known multilayered magnetic film.

Referring to FIG. 13, the multilayered magnetic film comprises a substrate 101 and a resin layer 102, an insulation layer 104, a magnetic layer 105 and another insulation layer 106 sequentially deposited on the substrate 101 to produce the multilayered magnetic film.

However, as pointed out above, in a known thin film magnetic element comprising such a multilayered magnetic film, the resin layer is particularly vulnerable to tensile stress and can easily give rise to cracks if compared with a thin film of a metal or a simple oxide. In view of this fact, the inventor of the present invention has succeeded in preparing a multilayered crack-free film comprising an insulation layer and a magnetic layer as ordinary multilayered magnetic film by observing certain conditions for forming film layers on a resin underlayer.

However, when such a multilayered magnetic film is compared with a conventional multilayered magnetic film prepared on a hard and flat substrate such as a substrate of thermally oxidized silicon, the high frequency magnetic characteristics of the former magnetic film are degradable to make it difficult to realize a high performance thin film magnetic element that reflects the proper characteristics of the magnetic layer. Presumably, this problem is attributable to an increase in the local anisotropic dispersion as discussed above and the resin underlayer that is typically made of polyimide may be damaged in various ways when the first insulation layer is formed for the multilayered magnetic film. The use of an AlN layer is indispensable from the viewpoint of the adaptability to the magnetic layer and to various processing operations and hence there is a need for a technique that can effectively reduce possible damages to the resin layer, while maintaining the structure of conventional multilayered magnetic films.

Meanwhile, the degradation of the high frequency magnetic characteristics of magnetic film was not taken into consideration in the development of the above listed known techniques.

Thus, there is a strong demand for a multilayered magnetic film that is formed on a resin underlayer but shows excellent magnetic characteristics comparable to those that can be obtained by forming film layers on a flat and highly rigid substrate or a multilayered magnetic film that maintains the excellent structure of conventional multilayered magnetic films comprising an insulation layer and a magnetic layer and, at the same time, can reduce possible damages to the resin layer. There is also a demand for a thin film magnetic element comprising such a multilayered magnetic film.

BRIEF SUMMARY OF THE INVENTION

Therefore, it is an object of the present invention to provide a multilayered magnetic film adapted to reflect the characteristics of a soft magnetic film with an enhanced level of saturation magnetization or to show the characteristics of the magnetic materials used therein if laid on a resin layer. Another object of the invention is to provide a thin film magnetic element comprising such a multilayered magnetic film and showing only a low loss.

According to an aspect of the invention, the above first object is achieved by providing a multilayered magnetic film comprising:

a resin layer; and a multilayered magnetic film layer including one or more than one magnetic layers and one or more than one insulation layers and separated from the resin layer by a predetermined distance.

According to another aspect of the invention, the above second object is achieved by providing a thin film magnetic element having a multilayered magnetic film; the multilayered magnetic film comprising:

a resin layer; and a multilayered magnetic film layer including one or more than one magnetic layers and one or more than one insulation layers and separated from the resin layer by a predetermined distance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the present invention will be described by referring to the accompanying drawings that illustrate preferred embodiments of the invention.

Figure 1:
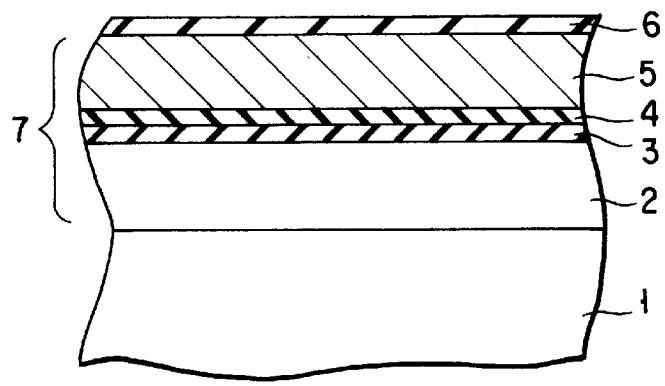
FIG. 1 is a schematic cross sectional view of a multilayered magnetic film according to the invention.
Figure 2A:
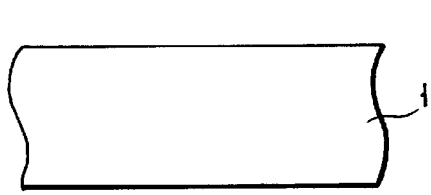
FIGS. 2A through 2F are schematic cross sectional views of a multilayered magnetic film according to the invention shown in different manufacturing steps.
Figure 2B:
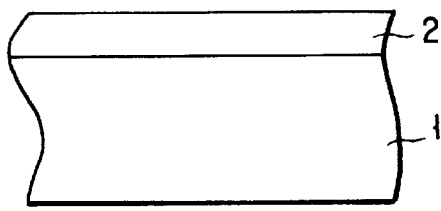
Figure 2C:
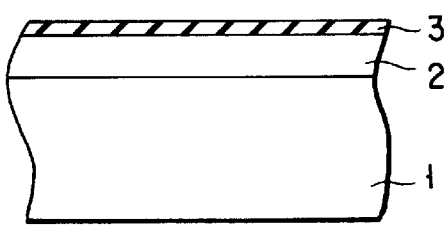
Figure 2D:
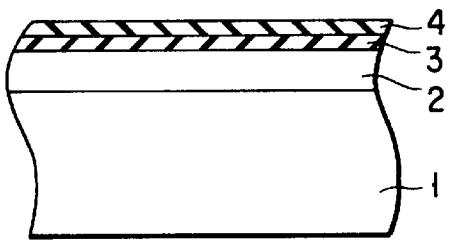
Figure 2E:
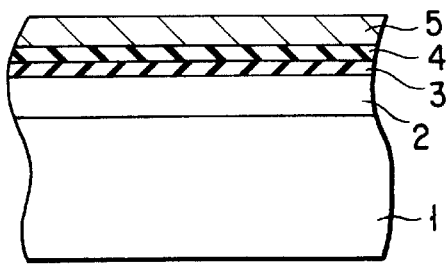
Figure 2F:
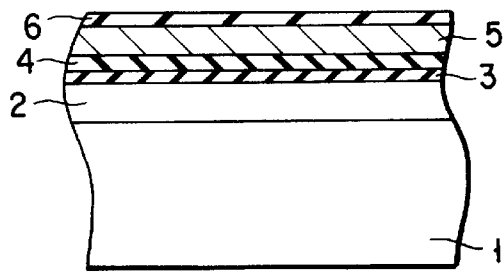

FIG. 1 is a schematic cross sectional view of an embodiment of multilayered magnetic film according to the invention, showing its structure.

Note that the present invention is not limited thereto by any means particularly in terms of the number and layers and their heights.

Referring to FIG. 1, this embodiment comprises a resin layer 2 operating as underlayer, a multilayered magnetic film layer of a magnetic layer 5 and an insulation layer 4 (magnetic layer/AlNx insulation layer) and a buffer layer 3 inserted between the resin layer 2 and the multilayered magnetic film layer. Thus, the multilayered magnetic film 7 of this embodiment comprises a magnetic layer 5, an insulation layer 4, a buffer layer 3 and a resin layer 2. Preferably, the buffer layer 3 is made of nitride of a metalloid element such as silicon nitride and arranged between the magnetic layer 5 and the coil conductor layer from the viewpoint of the structure of the magnetic element. It is not suitable to use an electrically conductive metal for the buffer layer 3 from the viewpoint of reducing the eddy current loss.

As described above, known thin film magnetic elements require to have an interface of an resin layer and a multilayered magnetic film layer. This is because a resin layer is required to fill the space of a coil layer and insulate and smooth the upper surface of the coil. A thin film magnetic element will show degraded high frequency complex magnetic characteristics when a multilayered magnetic film including one or more than one insulation layers and also one or more than one magnetic layers are formed directly on a resin underlayer even under optimum conditions. Thus, in this embodiment, the multilayered magnetic film layer and the resin layer are separated from each other by a given distance so that the two layers do not provide an interface. More specifically, a buffer layer 3 is inserted into the interface between the multilayered magnetic film layer and the resin layer 2 to prevent the problem of degradation of the high frequency magnetic characteristics.

Now, the process of manufacturing a multilayered magnetic film that can be used for this embodiment will be described by referring to FIGS. 2A through 2F. Note that an ordinary process for manufacturing a semiconductor thin film is incorporated here.

Firstly, a lower multilayered magnetic film is formed on the entire surface, or on part of the surface, of a substrate that may be made of single crystalline Si, Si carrying a thermally oxidized film, alumina, sapphire, magnesia, NaCl, aluminum nitride (Al nitride), GaAs or glass. If the underlying substrate 1 is not sufficiently smoothed or the magnetic layer to be formed thereon can be contaminated by some of the elements of the substrate, a resin underlayer 2 is formed before forming the lower multilayered magnetic film. This provides the first characteristic feature of the present invention (see FIGS. 2A, 2B).

Note here that the surface of the substrate may or may not be smoothed sufficiently by means of a currently available smoothing technique depending on the material selected for the substrate. Therefore, if a material is selected for the substrate from the viewpoint of other than smoothing, such as rigidity, the use of a resin layer 2 is effective for providing a flat and smooth underlayer.

Additionally, when a device including a magnetic element as component arranged on a wafer to integrally incorporate a plurality of functions and elements is to be formed on a single substrate, the wafer may carry elements other than a thin film magnetic element so that a resin underlayer may have to be formed only on part of the substrate.

Under any such conditions, it is a preferable choice to form a buffer layer 3, which is typically made of silicon nitride, on the resin underlayer 2. As a result, the resin layer 2 is protected against possible damages that can arise due to the heat generated when the multilayered magnetic film including one or more than one insulation layers 4 and one or more than one magnetic layers 5 is formed and/or the bombardment of charged particles. Additionally, the stress generated by the insulation layer 6 is prevented from directly affecting the resin layer 2 (see FIG. 2C).

While the stresses in different layers can affect each other in some way or other particularly between the layers that are held in contact with each other, the resin layer 2 can be particularly vulnerable to cracks, local undulations and stress dispersions during the film forming process because the stresses can vary as a function of various factors including the shift of the film growth mode and the softening of the resin due to the temperature rise of the resin underlayer itself during that process and the so-called substrate confining stress effect attributable to the temperature change during and after the film forming process.

The insulation layers 4, 6 of the multilayered magnetic film usually operates as protection layers for the magnetic layer 5. Therefore, insulation layers 6, 4 may be formed on and under the magnetic layer 5 respectively and this process of forming insulation layers may be repeated if necessary in order to cause the magnetic layer 5 to operate satisfactorily. An insulation layer 6 is typically formed at the top in order to fully protect the magnetic layer 5. At this stage, a multilayered magnetic film is formed by the layers from the resin underlayer 2 all the way to the top layer (see FIGS. 2D through 2F).

Now, a process of manufacturing a thin film magnetic element having a multilayered magnetic film will be described by referring to FIGS. 3 and 4.

After forming a multilayered magnetic film (e.g., FeCoBC/AlNx multilayered magnetic film) on a base substrate 11 (see FIG. 3A) by means of the above described process and before forming a coiled conductor layer, an operation of partitioning the unit magnetic element and that of intra-element partition of the multilayered magnetic film 12 will be conducted typically by means of a magnetic substance etching PEP (photo engraving process). At the same time, the coiled conductor layer itself will be subjected to a patterning process.

Figure 3A:
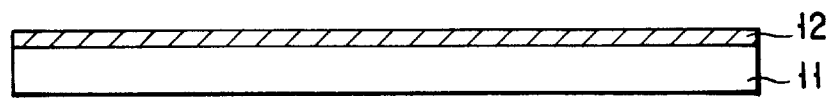
FIGS. 3A through 3D are schematic cross sectional views of a thin film magnetic element according to the invention shown in different manufacturing steps.
Figure 3B:
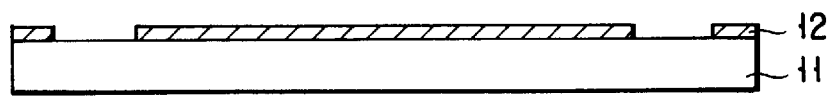
Figure 3C:
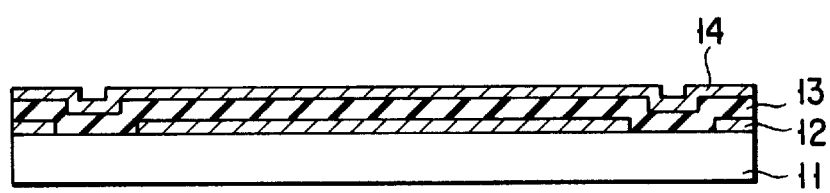
Figure 3D:
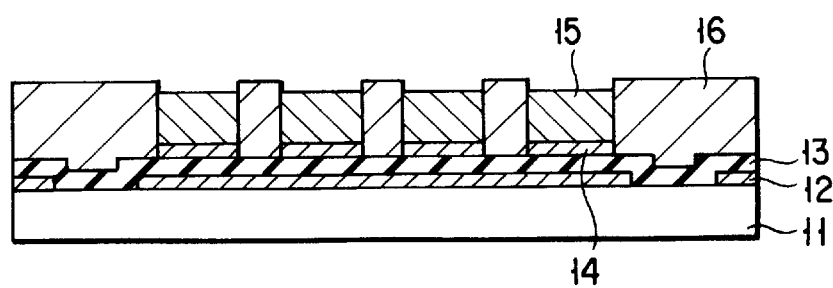
Figure 4A:
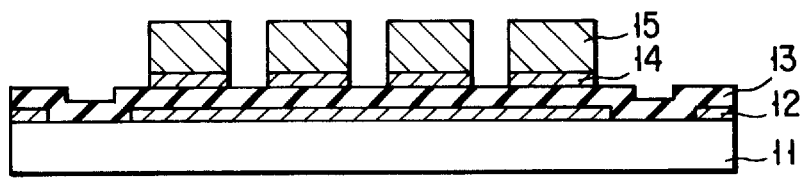
FIGS. 4A through 4D are schematic cross sectional views of the thin film magnetic element of FIGS. 3A through 3D shown in subsequent manufacturing steps.
Figure 4B:
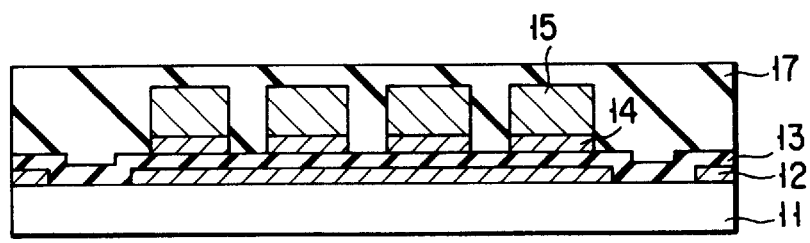
Figure 4C:
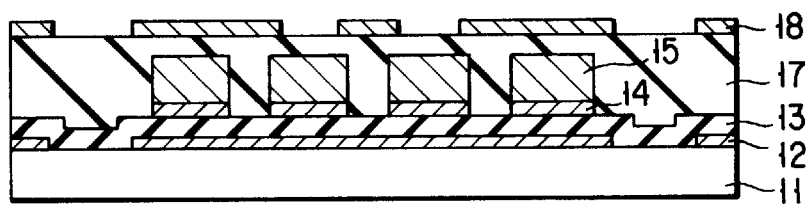
Figure 4D:
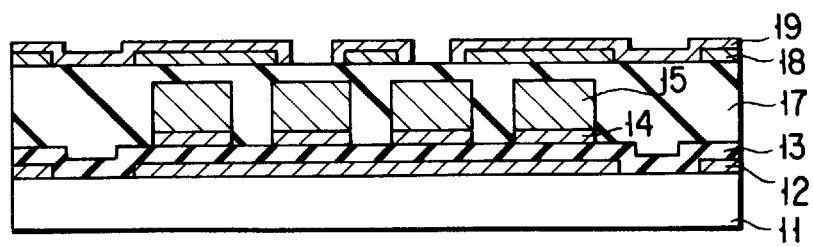

More specifically, after the magnetic substance etching PEP and the wet etching process (see FIG. 3B), an SiN sputtered film 13 will be produced by 5 $\mu$m-SiN sputtering and then a Cu sputtered film 14 will be produced by Cu/Nb sputtering (see FIG. 3C). Subsequently, the Cu sputtered film 14 is subjected to an etching PEP in order to produce a coil out of the film 14, which is then subjected to a wet etching process. Thereafter, a plating resist frame 16 is formed by means of a PEP and then a Cu electrolytic plating layer 15 is formed (see FIG. 3D). Then, the plating resist frame 16 is peeled off and then an Nb-CDE process will be conducted (see FIG. 4A) to produce a coiled conductor layer.

After forming the coiled conductor, an SiN film 17 is filled in the space of the coil by means of a polyimide burying technique in order to protect the Cu. Then, a smoothing/etching back CDE process will be conducted to smooth the surface and then a resin layer is formed once again (see FIGS. 4B and 4C). The resin layer is indispensable regardless of the material of the substrate. Then, an upper multilayered magnetic film 18 similar to the above described lower multilayered magnetic film 12 is arranged on the smoothed surface of the resin layer. This provides the second characteristic feature of the present invention. More specifically, like the first characteristic feature of the invention as pointed out above, a buffer layer typically made of silicon nitride is formed on the resin underlayer and then a multilayered magnetic film 18 comprising one or more than one insulation layers and one or more than one magnetic layers is formed thereon. Subsequently, pad-holes will be produced by means of a pad-hole PEP and then an Al/Mo film 19 is formed. Then, a pad metal etching process will be conducted by means of a pad metal PEP. Thereafter, a static magnetic field annealing/dicing process will be conducted (see FIG. 4D).

It will be appreciated that the resin layer is more or less relieved from damages as in the case of the description made earlier by referring to the lower multilayered magnetic film. At this stage, a multilayered magnetic film is formed by the layers from the smoothed resin layer on the coil all the way to the top layer.

A thin film magnetic element manufactured by the above described process and having a buffer layer of silicon nitride inserted to a predetermined position of the element provides various improvements as will be described in detail hereinafter. Briefly, the multilayered magnetic film will show an effect of avoiding degradation in the real part and suppressing the increase in the imaginary part of the high frequency complex magnetic permeability or an increase in the quality factor Q. The thin film magnetic element, on the other hand, will show an increase in the quality factor Q over the entire operational frequency range as an inductance element.

As described above, by inserting a buffer layer typically made of silicon nitride or some other nitride of metalloid element on the resin underlayer of a multilayered magnetic film comprising one or more than one insulation layers and one or more than one magnetic layers, where said multilayered magnetic film may or may not be part of a thin film magnetic element, any possible degradation in the high frequency characteristics of the multilayered magnetic film that may arise when it is directly arranged on a resin underlayer can be effectively avoided to ensure the proper characteristics of a magnetic film that can be obtained when it is arranged on a flat and rigid substrate.

Thus, a thin film magnetic element according to the invention and having an aggrandized multilayered magnetic film that comprises a resin layer and a buffer layer in addition to a proper multilayered magnetic film can ensure the proper characteristics of a multilayered magnetic film, while maintaining the remarkable structural features of the conventional multilayered magnetic film comprising one or more than one insulation layers and one or more than one magnetic layers. For example, a thin film magnetic element according to the invention may have an aggrandized multilayered magnetic film comprising an SiNx layer inserted between a proper magnetic film and a resin layer. Such an aggrandized multilayered magnetic film can effective avoid degradation in the high frequency characteristics.

Now, the characteristics of the specimen of multilayered magnetic film prepared in the first example and those of the specimens of multilayered magnetic film prepared in the first through third comparative examples will be discussed.

The specimens of the first example and the first through third comparative examples were prepared in a manner as described below.

In each of the above examples, polyimide was applied to the surface of an Si wafer as resin layer by means of a spin coater, the revolution per minute of which was so controlled as to produce a 8 $\mu$m thick polyimide film. The produced polyimide film was then heated treated at above 300° C. for an hour. In the first example, a 0.5 $\mu$m thick silicon nitride (SiNx) film was formed as buffer layer on the resin underlayer under predetermined conditions by means of reactive sputtering. No crack was observed in the formed film.

The obtained silicon nitride film may or may not contain boron as contaminator, although a level of contamination less than 1% will normally not give rise to any problem.

Then, in the first example, an FeCoBC magnetic film was formed on the SiNx underlayer under predetermined conditions. In each of the first through third comparative examples, on the other hand, an FeCoBC magnetic film was formed on the polyimide substrate under the predetermined conditions before forming an SiNx film. As will be discussed hereinafter, the predetermined conditions for forming a FeCoBC film as used herein refer to the optimized conditions for forming a film on a polyimide resin layer so that optimal magnetic characteristics were supposed to be obtained for the magnetic film in the absence of a silicon nitride film layer in any of the first through third comparative examples.

Thus, no silicon nitride buffer layer was inserted in any of the first through third comparative examples. Additionally, the second and third comparative examples were different from each other in terms of the Ar pressure used for etching the resin underlayer. The Ar pressure of the third comparative example was 4.0 Pa whereas that of the second comparative example was 0.3 Pa. While the resin underlayer of the first comparative example was etched under Ar pressure that was as low as that of the second comparative example, a cooling step was added in the first comparative example prior to the step of forming an AlN film from the viewpoint of protecting the resin layer, while no such cooling step was added in the second comparative example. Thus, the first example was same as the second comparative example except that a silicon nitride film was formed on the resin underlayer in the first example.

The specimens obtained as a result of the above film forming process were subjected to a static magnetic field annealing process under predetermined conditions. The applied maxim magnetic field was 1.6 MA/m. Before the static magnetic field annealing process, the specimens were cleaved to show the form of a short strip that is 120 mm long and 20 mm wide and the magnetic field was applied along the longitudinal direction. The specimens were further cleaved to show the form of a 10 mm×10 mm square while observing the magnetic field. A square profile was used to avoid the demagnetizing field effect that may arise relative to the anisotropic magnetic field defined by the difference in the saturation magnetic field that occurs as a function of its direction.

Note, however, that the saturation magnetic field itself includes an demagnetizing effect. The complex magnetic permeability of each of the specimens was measured by the inductance method. HP4192A or HP4191A was used as impedance analyzer.

As a result, a coercive force of 40 A/m or less was obtained along the magnetization hard axis for the first example and the first through third comparative examples when observed by means of a vibrating sample magnetometer for the static magnetic characteristic. The in-plane anisotropic magnetic field was found between 1,000 and 1,200 A/m to prove that the static magnetic characteristic stably shows a value proper to a magnetic film.

Figure 5:
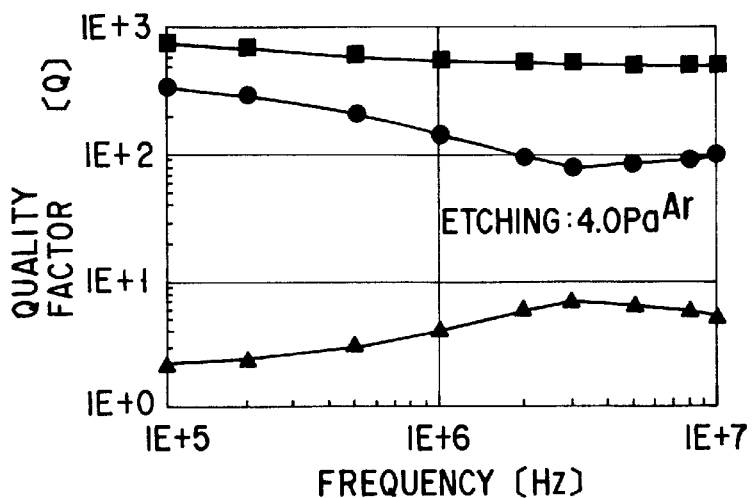
FIG. 5 is a graph showing the relationship between the high frequency complex magnetic permeability and the quality factor of a multilayered magnetic film obtained in a first example.

FIG. 5 is a graph showing the relationship between the high frequency complex magnetic permeability and the quality factor Q obtained by dividing the real part by the imaginary part of the complex magnetic permeability for the specimen of multilayered magnetic film in the first example.

Figure 6:
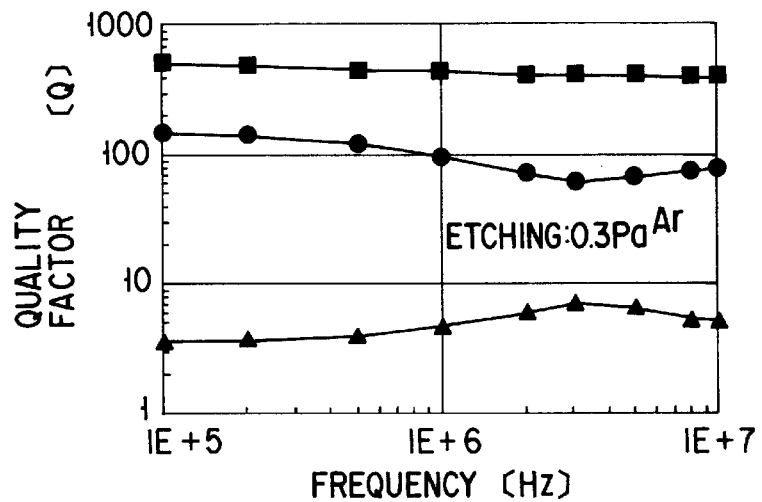
FIG. 6 is a graph showing the relationship between the high frequency complex magnetic permeability and the quality factor of a multilayered magnetic film obtained in a first comparative example.
Figure 7:
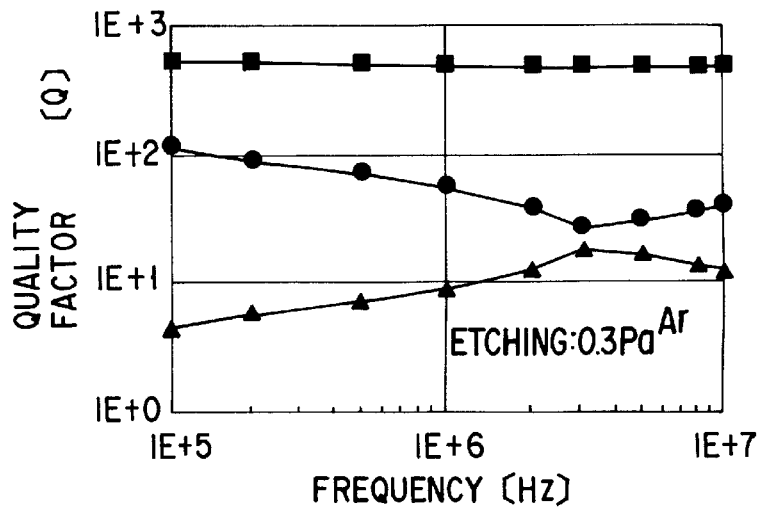
FIG. 7 is a graph showing the relationship between the high frequency complex magnetic permeability and the quality factor of a multilayered magnetic film obtained in a second comparative example.
Figure 8:
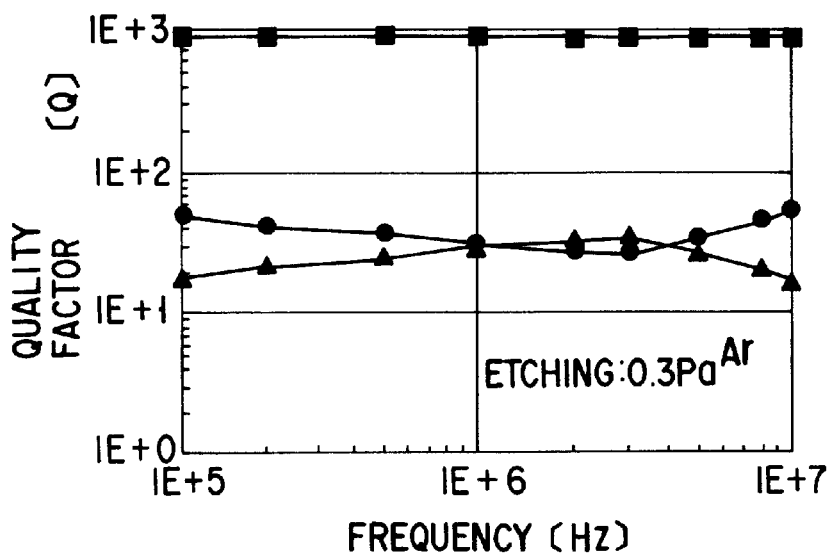
FIG. 8 is a graph showing the relationship between the high frequency complex magnetic permeability and the quality factor of a multilayered magnetic film obtained in a third comparative example.

Each of FIGS. 6 through 8 is a graph showing the relationship between the high frequency complex magnetic permeability and the quality factor Q obtained by dividing the real part by the imaginary part of the complex magnetic permeability for the specimen of multilayered magnetic film obtained in the corresponding one of the first through third comparative examples.

In the graphs, the square spots indicate the real part of the specific magnetic permeability and the round spots indicate the imaginary part of the specific magnetic permeability, whereas the triangular spots indicate the quality factor Q, which is obtained by dividing the real part by the imaginary part of the specific magnetic permeability, or the ratio of the two number parts.

As seen from FIGS. 5 through 8, the specimen of the first example had the largest real part of the magnetic permeability among the real parts of all the specimens including those of the first through third comparative examples and showed a very flat frequency dependency. It will also be seen from FIGS. 5 through 8 that the specimen of the first example shows an imaginary part for the complex magnetic permeability that is greatest among the imaginary parts of all the specimens including those of the first through third comparative examples to prove that the specimen had the smallest high frequency loss and hence the most excellent quality factor.

As described above, in the first comparative example, an adhesion Al layer was formed on a flat Si substrate and a multilayered magnetic film same as that of the first example was formed on it before the specimen was subjected to a static magnetic field annealing under the conditions that were common with those of the first example.

Figure 9:
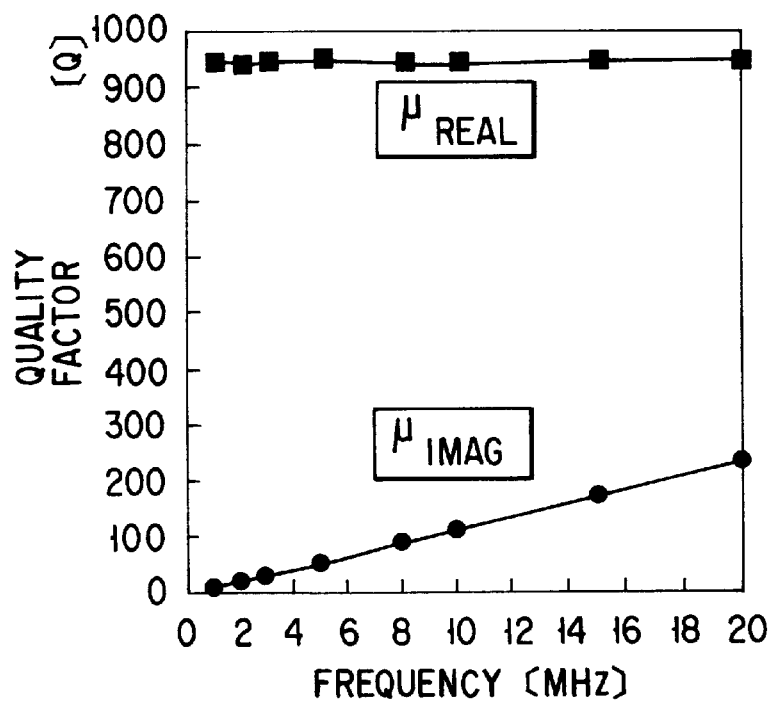
FIG. 9 is a graph showing the high frequency complex magnetic permeability of the first example and that of the first comparative example.

FIG. 9 is a graph showing the high frequency complex magnetic permeability of the first example and that of the first comparative example for the purpose of comparison. In the graphs again, the square spots indicate the real part of the specific magnetic permeability and the round spots indicate the imaginary part of the specific magnetic permeability.

As seen from the graph, the specimen of the first example performed more excellently than that of the first comparative example but also reproduced on a resin underlayer the real part of the high frequency complex magnetic permeability of a proper multilayered magnetic film on a smooth and rigid substrate. It will be seen that the imaginary part, or the loss, of the magnetic permeability of the specimen of the first example was smaller than that of the specimen of the first comparative example at and around 10MHz. The may indicate that the specimen of the first comparative example had an Al layer adhering to the underlayer and the eddy current loss of the Al gave rise to the little increase in the loss. The buffer layer typically made of silicon nitride of a multilayered magnetic film according to the invention has a feature of hardly giving rise to any eddy current loss.

Meanwhile, the specimen of the second comparative example had a value smaller than that of the third comparative example for the imaginary part of the magnetic permeability to prove that the magnetic characteristics of a multilayered magnetic film is more apt to be degraded if the Ar gas pressure is high during the etching operation and that the surface conditions including the damages of the resin underlayer are reflected to the magnetic characteristics of the magnetic film on the resin underlayer in a multilayered magnetic film. The process of the first comparative example was realized by adding a cooling step conducted before forming the multilayered magnetic film to the process of the second comparative example and the specimen of the former example showed improved magnetic characteristics relative to those of the specimen of the latter example, although they were not as improved as those of the specimen of the first example.

In each of the fifth through seventh comparative examples, polyimide was applied to the surface of an Si (100) wafer as resin layer by means of a spin coater, the revolution per minute of which was so controlled as to produce a 8 $\mu$m thick polyimide film. The produced polyimide film was then heat treated at above 300° C. for an hour. Then, in the fifth through seventh comparative examples, 0.5 $\mu$m thick W, $SiO_2$, Ta films were respectively formed as buffer layers on the resin underlayers under predetermined conditions by means of reactive sputtering. However, cracks were observed in all the obtained buffer layers to prove that they could not operate effective as buffer layers of the multilayered magnetic films.

The above observation proves that some of the materials that are commonly used for electronic equipment cannot suitably be used for buffer layers. Contrary to this, the buffer layer of silicon nitride of the multilayered magnetic film prepared in the first example showed no crack to prove the effectiveness of the buffer layer of the specimen of the first example.

Now, the characteristics of the specimen of multilayered magnetic film prepared in the second example and those of the specimen of multilayered magnetic film prepared in the fourth comparative example will be discussed.

In the second example, a specimen of thin film magnetic element was prepared by forming a coiled conductor on a multilayered magnetic film that was same as that of the first example, forming an upper smoothing resin layer thereon, further forming a silicon nitride film thereon under predetermined conditions and then forming a multilayered magnetic layer thereon under the conditions same as those of the first example.

Figure 11:
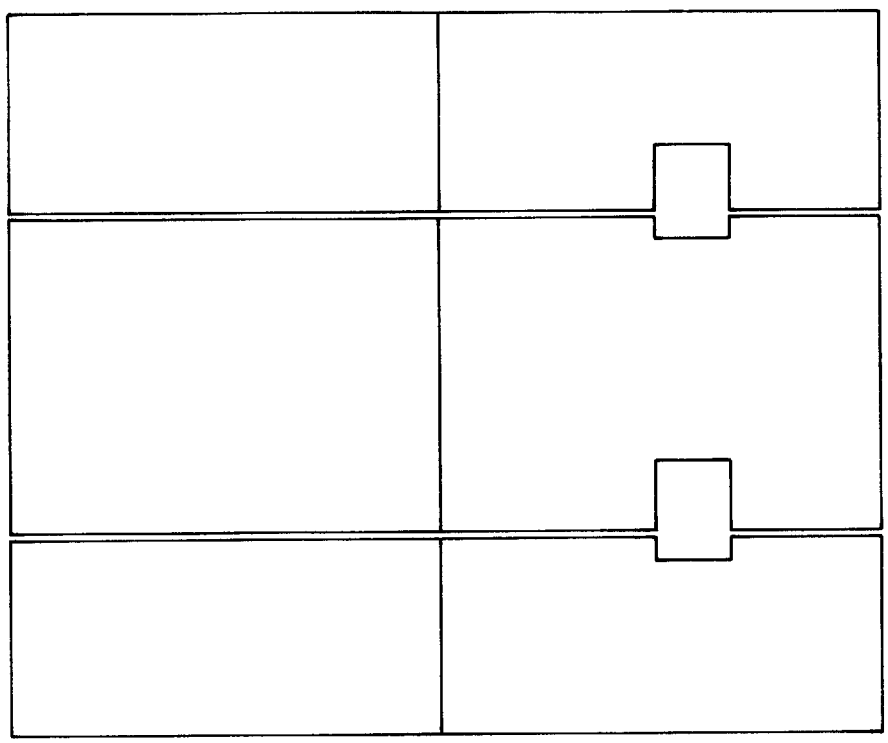
FIG. 11 is a schematic view of the pattern of the multilayered magnetic film of the second example and that of the fourth comparative example.
Figure 12:
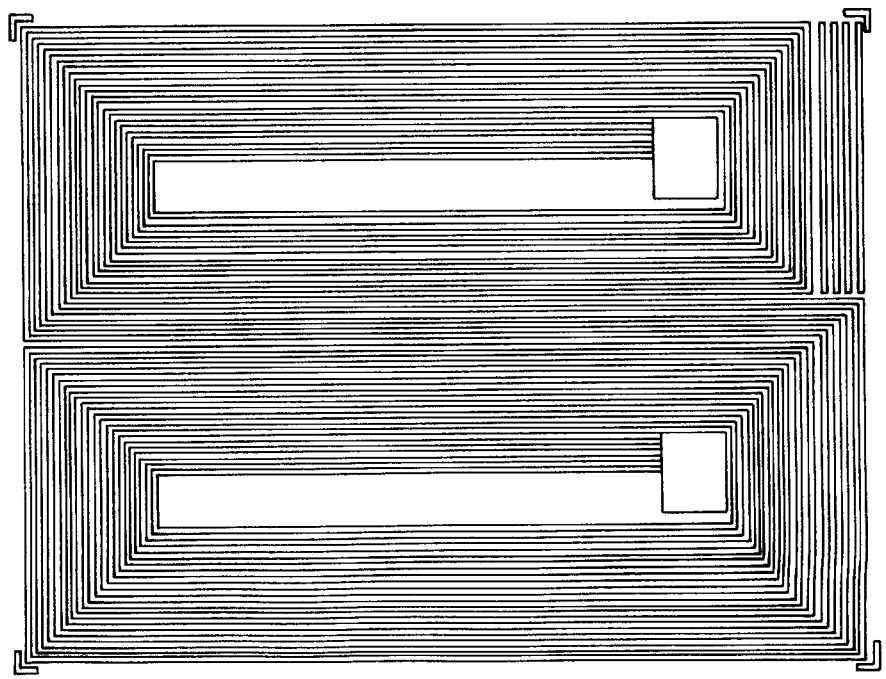
FIG. 12 is a schematic view of the pattern of the coil of the second example and that of the fourth comparative example.

In the fourth comparative example, on the other hand, a specimen of thin film magnetic element was prepared by forming a coiled conductor on the multilayered magnetic film of the specimen of the first comparative example which had showed the most excellent magnetic characteristics as magnetic film, forming an upper smoothing resin layer thereon and then forming a multilayered magnetic layer thereon under the conditions same as those of the first comparative example. Note that the specimen of the second example and that of the fourth comparative example had same patterns for their multilayered magnetic films and coiled conductors as shown in FIGS. 11 and 12.

Figure 10:
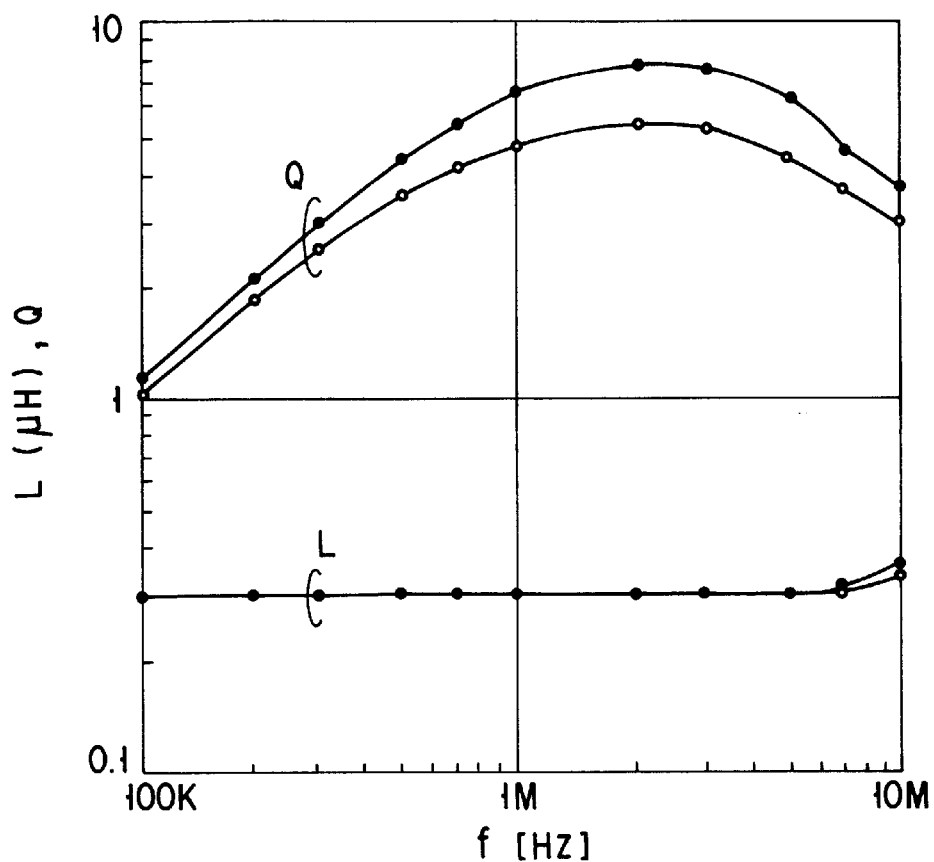
FIG. 10 is a graph showing the relationship between the inductance and the quality factor of the thin film magnetic element of the second example and that of the thin film magnetic element of the fourth comparative example.
Figure 13:
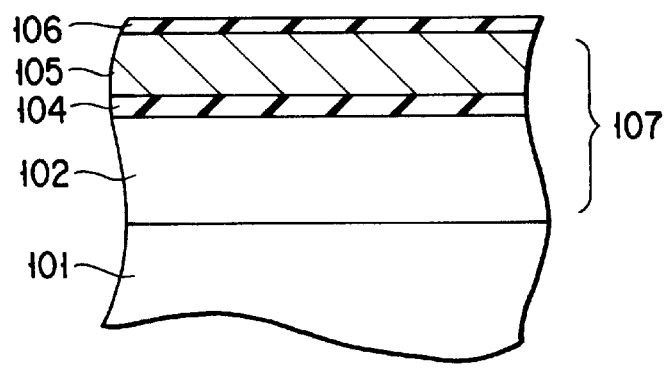
FIG. 13 is a schematic cross sectional view of a known multilayered magnetic film.

FIG. 10 is a graph showing the relationship between the inductance and the quality factor of the thin film magnetic element of the second example and that of the thin film magnetic element of the fourth comparative example. Note that in FIG. 10, the black spots are for the specimen of the second example, whereas the white spots are for the specimen of the fourth comparative example.

As seen from FIG. 10, the specimen of the second example showed an improvement of greater than 2 in the Q value as compared with its counterpart of the fourth comparative example. As for the inductance value L, the specimen of the second example was superior to that of the fourth comparative example at and around 10 MHz. Thus, the specimen of the second example was proved to be by far more effective than that of the fourth comparative example. The multilayered magnetic film on the resin layer of the specimen of the fourth comparative example showed a remarkable degradation in the high frequency magnetic characteristics and the magnetic characteristics of the thin film magnetic element comprising the multilayered magnetic film was also degraded to prove that the specimen of the fourth comparative example could not operate satisfactorily to reflect the proper characteristics of a magnetic layer.

As discussed above in detail, an aggrandized multilayered magnetic film according to the invention and having an SiNx layer inserted between a multilayered magnetic film that comprises one or more than one insulation layers and one or more than one magnetic layers and a resin layer (polyimide layer) as described by referring to the first example can avoid any degradation in the high frequency magnetic characteristics of the magnetic layer. Such a multilayered magnetic film shows an excellent adaptability to various processes and a satisfactory adhesive force on the interface of the resin layer and the multilayered magnetic film mainly because of a small internal stress of SiN, small damages that charged particles and heat can give to the resin layer during the film forming process and the small adverse effect that the magnetic film receives through the AlN layer typically by dispersion. A multilayered magnetic film according to the invention provides an additional advantage of an improved through put due to the simplified polyimide pretreatment.

A thin film magnetic element according to the second aspect of the invention and comprising a multilayered magnetic film according to the first aspect of the invention can maintain the magnetic characteristics of a proper magnetic thin film. Therefore, according to the invention, there is provided a multilayered magnetic film showing an excellent high frequency inductance and a low loss to reflect the proper and remarkable high frequency complex magnetic permeability of a magnetic film along with an enhanced adaptability to various device processes and also a thin film magnetic element having such a multilayered magnetic film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A thin film inductor having a multilayered magnetic film, said multilayered magnetic film comprising:
   a resin layer; and
   a multilayered magnetic film layer including one or more than one magnetic layers and one or more than one insulation layers and separated from said resin layer by a predetermined distance, wherein said magnetic layer or layers of said multilayered magnetic film layer contain at least Fe and Co and have a large in-plane uniaxial magnetic anisotropy.

2. A thin film inductor having a multilayered magnetic film, said multilayered magnetic film comprising:
   a resin layer;
   a multilayered magnetic film layer including one or more than one magnetic layers and one or more than one insulation layers, wherein said magnetic layer or layers of said multilayered magnetic film layer contain at least Fe and Co and have a large in-plane uniaxial magnetic anisotropy; and
   a buffer layer inserted into at least part of the interface between said resin layer and said multilayered magnetic film layer.

3. A thin film inductor having a multilayered magnetic film, said multilayered magnetic film comprising:
   a resin layer; and
   a multilayered magnetic film layer including one or more than one magnetic layers and one or more than one Al nitride layers, wherein said magnetic layer or layers of said multilayered magnetic film layer contain at least Fe and Co and have a large in-plane uniaxial magnetic anisotropy; and
   a Si nitride layer inserted into at least part of the interface between said resin layer and said Al nitride layers of said multilayered magnetic film layer.

4. A thin film inductor having a multilayered magnetic film, said multilayered magnetic film comprising:
   a resin layer; and
   a multilayered magnetic film layer including one or more than one magnetic layers and one or more than one insulation layers and separated from said resin layer by a predetermined distance, wherein said magnetic layer or layers of said multilayered magnetic film layer contain at least Fe, Co, B and C and have a large in-plane uniaxial magnetic anisotropy.

5. A thin film inductor having a multilayered magnetic film, said multilayered magnetic film comprising:
   a resin layer;
   a multilayered magnetic film layer including one or more than one magnetic layers and one or more than one insulation layers, wherein said magnetic layer or layers of said multilayered magnetic film layer contain at least Fe, Co, B and C and have a large in-plane uniaxial magnetic anisotropy; and
   a buffer layer inserted into at least part of the interface between said resin layer and said multilayered magnetic film layer.

6. A thin film inductor having a multilayered magnetic film, said multilayered magnetic film comprising:
   a resin layer; and
   a multilayered magnetic film layer including one or more than one magnetic layers and one or more than one Al nitride layers, wherein said magnetic layer or layers of said multilayered magnetic film layer contain at least Fe, Co, B and C and have a large in-plane uniaxial magnetic anisotropy; and
   a Si nitride layer inserted into at least part of the interface between said resin layer and said Al nitride layers of said multilayered magnetic film layer.

* * * * *